(12) United States Patent
Khouri et al.

(10) Patent No.: US 7,720,919 B2
(45) Date of Patent: May 18, 2010

(54) AUTOMATIC RESTRICTION OF REPLY EMAILS

(75) Inventors: Joseph F. Khouri, San Jose, CA (US); Laurent Philonenko, San Francisco, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 437 days.

(21) Appl. No.: 11/712,245

(22) Filed: Feb. 27, 2007

(65) Prior Publication Data

US 2008/0208988 A1  Aug. 28, 2008

(51) Int. Cl.
*G06F 15/16* (2006.01)
(52) U.S. Cl. .................. 709/206; 709/204; 709/245
(58) Field of Classification Search .................. 709/206
See application file for complete search history.

(56) References Cited

U.S. PATENT DOCUMENTS

| | | | |
|---|---|---|---|
| 4,993,022 A | 2/1991 | Kondo et al. | |
| 5,675,778 A | 10/1997 | Jones | |
| 5,729,687 A | 3/1998 | Rothrock et al. | |
| 5,872,925 A * | 2/1999 | Han | 709/206 |
| 5,983,192 A | 11/1999 | Botzko et al. | |
| 5,987,106 A | 11/1999 | Kitamura | |
| 6,009,519 A | 12/1999 | Jones et al. | |
| 6,014,427 A | 1/2000 | Hanson et al. | |
| 6,236,854 B1 | 5/2001 | Bradshaw, Jr. | |
| 6,259,405 B1 | 7/2001 | Stewart et al. | |
| 6,342,903 B1 | 1/2002 | Fado et al. | |
| 6,438,215 B1 | 8/2002 | Skladman et al. | |
| 6,496,201 B1 | 12/2002 | Baldwin et al. | |
| 6,501,739 B1 | 12/2002 | Cohen | |
| 6,545,596 B1 | 4/2003 | Moon | |
| 6,590,604 B1 | 7/2003 | Tucker et al. | |
| 6,602,820 B1 | 8/2003 | Bradshaw, Jr. | |
| 6,604,078 B1 | 8/2003 | Shimazaki | |
| 6,671,262 B1 | 12/2003 | Kung et al. | |
| 6,674,451 B1 | 1/2004 | Fado et al. | |
| 6,785,868 B1 | 8/2004 | Raff | |
| 6,816,469 B1 | 11/2004 | Kung et al. | |
| 6,865,540 B1 | 3/2005 | Faber et al. | |
| 6,876,734 B1 | 4/2005 | Summers et al. | |
| 6,885,900 B1 | 4/2005 | Rybicki et al. | |
| 6,889,054 B2 | 5/2005 | Himmel et al. | |
| 6,905,414 B2 | 6/2005 | Danieli et al. | |
| 6,907,112 B1 | 6/2005 | Guedalia et al. | |

(Continued)

FOREIGN PATENT DOCUMENTS

EP  1 170 726 A  1/2008

*Primary Examiner*—Firmin Backer
*Assistant Examiner*—Hamza Algibhah
(74) *Attorney, Agent, or Firm*—The Law Offices of Bradley J. Bereznak

(57) ABSTRACT

In one embodiment, a method includes detecting, by an automated program, an attempt by a recipient of an email addressed to a plurality of addressees that includes the recipient to send a reply-all email. The automated program rejecting the reply-all email based on a pre-set policy rule that limits a number of reply-all email in a thread. It is emphasized that this abstract is provided to comply with the rules requiring an abstract that will allow a searcher or other reader to quickly ascertain the subject matter of the technical disclosure.

11 Claims, 5 Drawing Sheets

U.S. PATENT DOCUMENTS

| | | |
|---|---|---|
| 6,909,778 B2 | 6/2005 | Wengrovitz |
| 6,931,001 B2 | 8/2005 | Deng |
| 6,931,113 B2 | 8/2005 | Ortel |
| 6,970,908 B1 | 11/2005 | Larky |
| 6,985,745 B2 | 1/2006 | Quaid |
| 6,987,744 B2 | 1/2006 | Harrington et al. |
| 7,058,356 B2 | 6/2006 | Slotznik |
| 7,124,087 B1 | 10/2006 | Rodriguez et al. |
| 2002/0037074 A1 | 3/2002 | Dowens et al. |
| 2002/0098831 A1 | 7/2002 | Castell et al. |
| 2002/0124057 A1 | 9/2002 | Besprosvan |
| 2002/0140745 A1 | 10/2002 | Ellenby et al. |
| 2003/0046344 A1 | 3/2003 | Kumhyr et al. |
| 2003/0110227 A1* | 6/2003 | O'Hagan .................... 709/206 |
| 2003/0130014 A1 | 7/2003 | Rucinski |
| 2003/0152214 A1 | 8/2003 | Mori et al. |
| 2004/0047461 A1 | 3/2004 | Weisman |
| 2004/0086095 A1 | 5/2004 | Rajeev et al. |
| 2004/0105529 A1 | 6/2004 | Salvucci et al. |
| 2004/0156485 A1 | 8/2004 | Poustchi et al. |
| 2004/0162747 A1 | 8/2004 | Yeh et al. |
| 2004/0225650 A1 | 11/2004 | Cooper |
| 2004/0234046 A1 | 11/2004 | Skladman et al. |
| 2004/0249895 A1* | 12/2004 | Way ........................... 709/206 |
| 2004/0267527 A1 | 12/2004 | Creamer et al. |
| 2005/0037739 A1 | 2/2005 | Zhong |
| 2005/0066005 A1* | 3/2005 | Paul .......................... 709/206 |
| 2005/0135383 A1 | 6/2005 | Shenefiel |
| 2005/0157708 A1 | 7/2005 | Chun |
| 2005/0177622 A1 | 8/2005 | Spielman et al. |
| 2005/0210112 A1 | 9/2005 | Clement et al. |
| 2005/0262208 A1 | 11/2005 | Haviv et al. |
| 2006/0031326 A1 | 2/2006 | Ovenden |
| 2006/0078120 A1 | 4/2006 | Mahendran et al. |
| 2006/0122835 A1 | 6/2006 | Huart et al. |
| 2006/0146735 A1 | 7/2006 | Shaffer et al. |
| 2006/0179114 A1* | 8/2006 | Deeds ........................ 709/206 |
| 2006/0193459 A1 | 8/2006 | Cadiz et al. |
| 2006/0253593 A1 | 11/2006 | Jachner |
| 2007/0016465 A1 | 1/2007 | Schaad |
| 2007/0214216 A1* | 9/2007 | Carrer et al. ................ 709/204 |
| 2008/0034043 A1* | 2/2008 | Gandhi et al. ............... 709/206 |
| 2008/0168269 A1* | 7/2008 | Wilson ....................... 713/160 |

\* cited by examiner

AUTOMATIC RESTRICTION OF REPLY EMAILS

FIELD OF THE INVENTION

The present disclosure relates to the fields of telephony and electronic mail, commonly called "email".

BACKGROUND OF THE INVENTION

Most computer systems and networks have an electronic mail system that enables a user to send an electronic message (email) to one or more recipients located anywhere in the world. Email messages typically comprise text notes entered from the keyboard or electronic files stored on disk. Most email systems allow a user to send an email to a number of individuals (i.e., a mailing list) simply by specifying their email addresses in a "To:" or "Cc:" field or box of a user interface window. Similarly, an individual recipient of an email sent to multiple persons (addressees) may send a reply email to all of the recipients addressed in the original email simply by "clicking" on a "reply-all" icon or button of a graphical user interface (GUI) window. In other words, a reply-all email is delivered to everyone addressed in the original email. A series of email messages posted as back-and-forth replies to each other is commonly known as an email "thread". By reading each email message in a thread, one after the other, it is possible to trace the history of the discussion.

A problem can arise when multiple email recipients engage in back-and-forth discussions using the reply-all email feature. For instance, what happens sometimes is that several recipients of a reply-all email (to which they have no interest in) will send a responsive reply-all email asking the other recipients to refrain from sending any more reply-all emails. When there are numerous recipients listed in an on-going email discussion or thread, the number of reply-all email transmissions can multiply quickly. This problem is referred to as a "runaway email thread" which consumes valuable resources and is a source of irritation and aggravation for recipients of reply-all emails.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION OF EXAMPLE EMBODIMENTS

In the following description specific details are set forth, such as applications, configurations, methods, etc., in order to provide a thorough understanding of the present invention. However, persons having ordinary skill in the relevant arts will appreciate that these specific details may not be needed to practice the present invention.

It should be understood that in the context of the present application the term "email" (as a noun or verb) is broadly understood to apply both to Internet email systems, e.g., based on the Simple Mail Transfer Protocol (SMTP), and to intranet systems that allow users within an organization or enterprise to communicate with each other via electronic messages. An "email client", also called a mail user agent (MUA), is a computer program or application that is used for composing, sending, storing, and receiving of electronic messages over a communication network or system. A "thread" or "email thread" denotes a series of email messages involving multiple addressees or recipients that have been posted as replies to each other.

An "email system", as that term is used in the present disclosure, may refer to a single computer system or network, or more expansive systems that include gateway devices connected to other computer systems, thus enabling users to send electronic mail anywhere in the world. An endpoint is any device, component, element, or object capable of sending or receiving an email message over a network. An endpoint may comprise a personal computer (PCs), workstation, personal digital assistant (PDA), laptop or notebook computer, or other messaging equipment.

Figure 1:
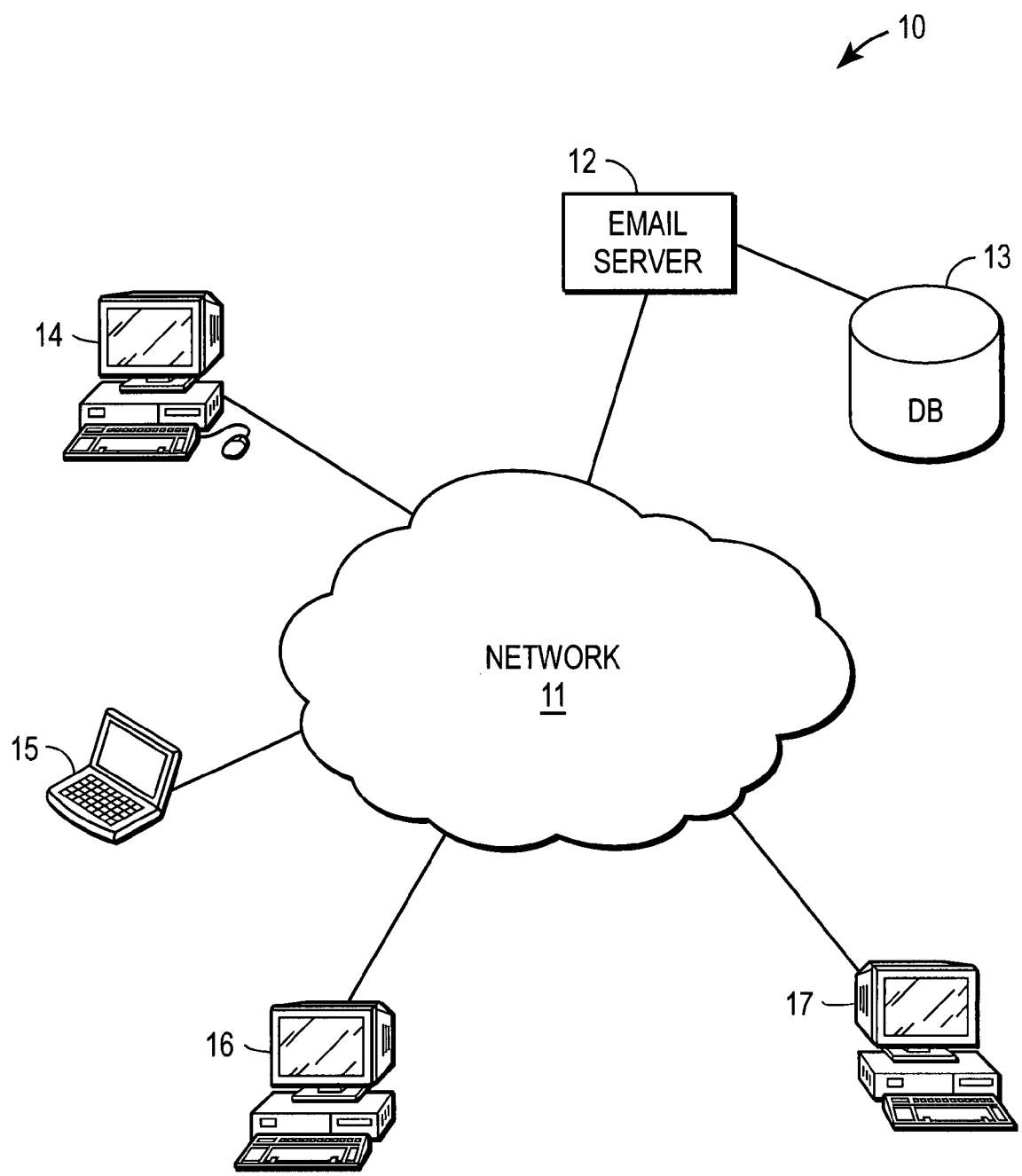
FIG. 1 illustrates an example electronic communications system.

FIG. 1 illustrates an example electronic communications system 10 for composing, sending, storing, and receiving messages over a network 11. In this example, email messages may be sent/received by any of endpoint devices, (e.g., personal computers or PCs) 14-17. An email server 12 connected with network 11 comprises a computer device dedicated to storing files applications/utilities for enabling and managing email messaging among the users associated with endpoint devices 14-17. A database or directory 13 is shown connected directly to server 12. In one embodiment, directory 13 comprises a directory service used to store information, relationships, and settings about the network resources across an enterprise, organization, or domain. Directory 13 is accessible to server 12, and may also be accessed by users and administrators to assign enterprise-wide rules and policies to email messages transmitted over network 11.

It is appreciated that although the example of FIG. 1 shows directory 13 connected directly to server 12, in other implementations directory 13 may be incorporated into server 12 or accessed via network 11. In certain implementations, directory 13 may be implemented in a separate machine, such as a policy server, that communicates with email server 12 to manage user-specific or system-wide policies, such as those described below. In a specific embodiment, directory 13 is an implementation of Lightweight Directory Access Protocol (LDAP) directory services by Microsoft for use in Windows environments, which is structured as a hierarchical framework of objects (e.g., resources, users, and email services).

Network 11 may comprise an enterprise intranet, an Internet Protocol (IP) network, or any communications network capable of transmitting email messages between endpoint devices 14-17. The signaling path utilized for transmission of email messages may be across any network resources. Furthermore, it is appreciated that endpoints 14-17 may be configured to run an email client in the form of executable code for the purpose of composing, sending and receiving email messages. That is, computers 14-17 may be configured to run email client or other messaging applications either directly or via network 11.

In a specific embodiment, the methods and functionality described herein may be implemented by software or hardware (firmware) installed in an endpoint device (e.g., PC), an email server, or some other electronic messaging system component, including an application utilized for email messaging. Practitioners in the art will understand that the software or firmware installed in the systems and components mentioned above may be adapted or modified to implement the functions and capabilities described herein.

In a particular embodiment, each of computers 14-17 may run a software program that generates a graphical user interface (GUI) which comprises a collaborative web-based application that is accessed by the browser software running on the user's PC. In other instances, the GUI may comprise a downloaded application, or other forms of computer-executable code that may be loaded or accessed by a PC. For instance, the software code for implementing the GUI may be executed on server 12 connected to network 11 and accessed by a user of any of computers 14-17 for the purpose of utilizing the features provided therein.

In the example of FIG. 1, executable code running on email server 12 implements rules or settings that are used to restrict or limit the number of reply or reply-all emails sent in any given email thread. The code applies to emails sent to a plurality of recipients, such as emails sent to large mailing or distribution lists. The rules or settings may be stored in directory 13 and accessed by email server in response to detection of a reply-all email. These rules or settings, which may be managed by individual users (customized rules/settings for each user) or by a system administrator, can be statically defined or dynamically adjusted, i.e., during the lifetime of an active email thread.

Continuing with the example of FIG. 1, in one embodiment email server 12 implements a mechanism that allows a composer/sender of an email to set a reply-all limit variable at server 12 for a given email thread. For instance, a default setting associated with the user or organization may allow for unlimited reply-all emails, with this setting being modifiable by the user prior to actually sending an email to a list of recipients. In the event that the sender wants to disable all reply-all emails—meaning that none of the recipients of the original email may send a reply email to all of the listed the sender may, through the use of a graphical user interface, override the default setting by setting the reply-all limit variable to zero. Alternatively, the user might set the reply-all limit variable to six or eight reply-all emails to allow for some back-and-forth discussion in the thread, while, at the same time, preventing a runaway email thread situation from occurring.

When email server 12 detects that the reply-all limit has been reached for a given thread, it inhibits any of the recipients from composing or sending a reply-all email. In addition, email server may inform anyone attempting to compose or send a reply-all that the maximum limit for reply-ails has been reached and thereafter reject or disable any more reply-all emails for this thread.

Figure 2:
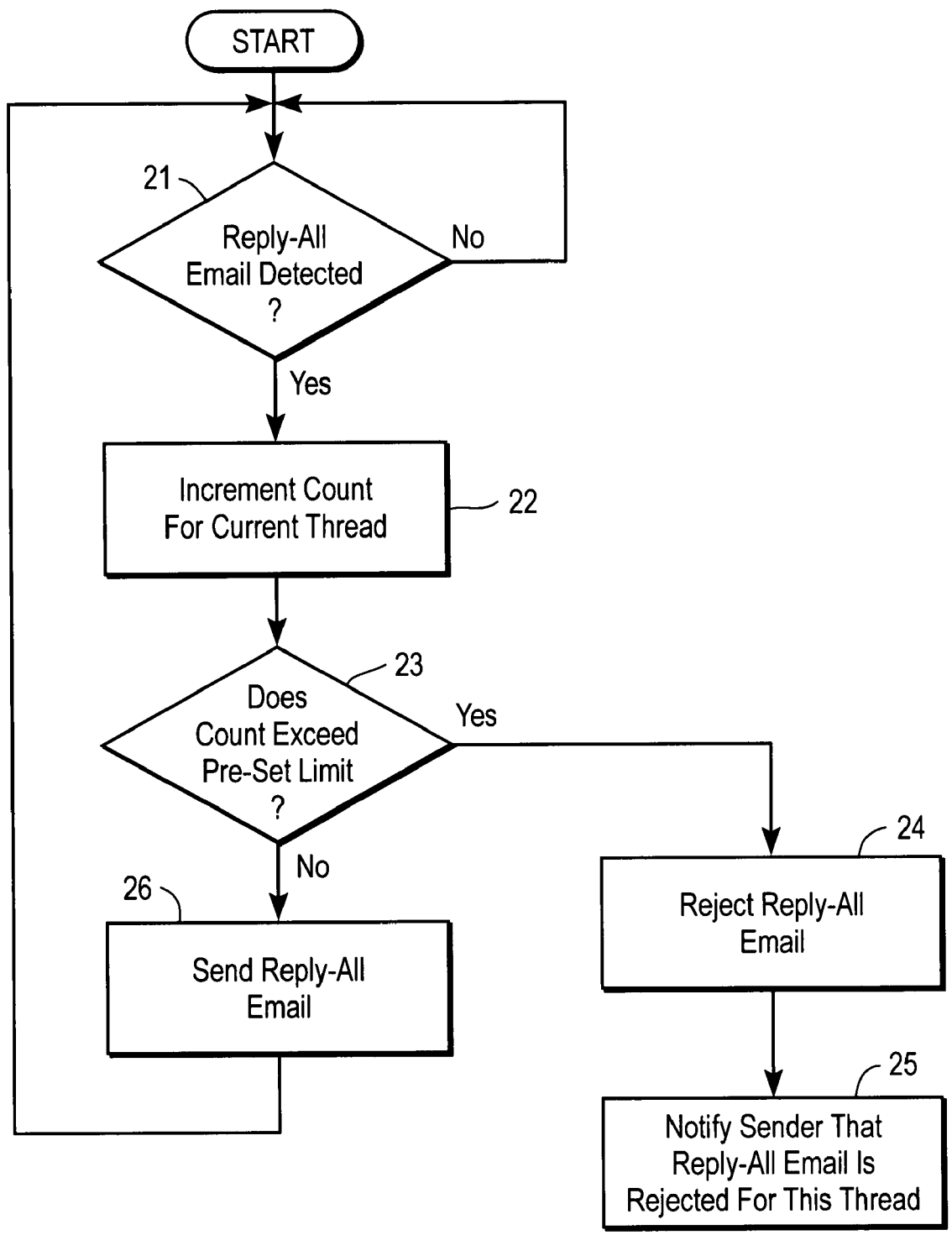
FIG. 2 illustrates an example method of operation for the system of FIG. 1.

FIG. 2 illustrates an example method of operation for the system of FIG. 1. The process starts after an original email has been transmitted to a plurality of email recipients. At that point, the email server looks to detect whether any of the email recipients is attempting to send a reply-all email (block 21). In response to an attempt by any recipient to send a reply-all email, the email server increments a counter associated with the current thread (block 22). Once incremented, the count is then compared to the reply-all limit variable that is currently set for the associated email thread (block 23). In the event that the count does not exceed (less than or equal to) the pre-set reply-all limit, the reply-all is sent to all recipients of the original email (block 26). The process then returns back to the start, i.e., detecting another reply-all email.

If, on the other hand, the reply-all email count exceeds the pre-set limit, the server rejects/disables the sending of the reply-all email (block 24) and notifies the sender (the user attempting to send the reply-all) that further reply-all emailing is prohibited for this thread (block 25). By way of example, if the reply-all limit is set to six, such that a total of six reply-all emails may be sent by any of the recipients listed in the original email, after the sending of the sixth reply-all email, any attempt by any recipient to send another reply-all email results in the reply-all email being rejected. In other words, nobody in the mailing list of the original email is allowed to send a reply-all message after the sixth reply-all email has been send. In addition, the server may also notify the sender that the reply-all has been rejected because the reply-all limit has already been reached.

In other cases, instead of limiting the total number of reply-all emails the policy rules may assign a predetermined number of reply-all emails to each recipient. For example, each recipient listed in a mailing or distribution list may be allowed up to three reply-all emails. In another implementation, the number of reply-all emails allowed in a given thread may vary on a recipient-by-recipient basis. For instance, a director or manager may be assigned up to ten reply-all emails, while a lower level subordinate may only be allowed to send one or two (or zero) reply-all emails. Practitioners in the art will appreciate that the individuals who are allowed to send a reply or reply-all email can be identified using any of a variety of well-known methods, some of which may involve the use of other applications or programs.

Note that in certain embodiments, the original email sender may be allowed to change the reply-all limit value after sending the email. For example, the original sender (or system administrator) can choose to initially set the reply-all limit value to "unlimited", and at a later point in time change the reply-all limit value to some finite or lesser number (e.g., zero), thereby disabling all future reply-all emails for that thread.

In yet another embodiment, the email system may consider configuration rules stored in an appropriate directory system, for example, Microsoft's Active Directory, in which case and the original sender or email server can pick up and apply rules such as, "reply-all only to addresses of persons in the same hierarchical depth within the same branch of the organization tree", or reply-all only to just the sender or the original email and your peers, etc. The policy rules applied to email transmission may reside on a machine separate from the email server or email application responsible for storing, sending and receiving email messages for a given individual or organization. Reply-all and reply buttons on the receiver end could also be enabled/disabled on a per user or hierarchy basis based on sender's selection (making it similar to half duplex communication in email technology).

It is appreciated that the policy rules applied to reply email transmissions may reside on a machine separate from the email server or email application responsible for storing, sending and receiving email messages for a given individual or organization.

Figure 3:
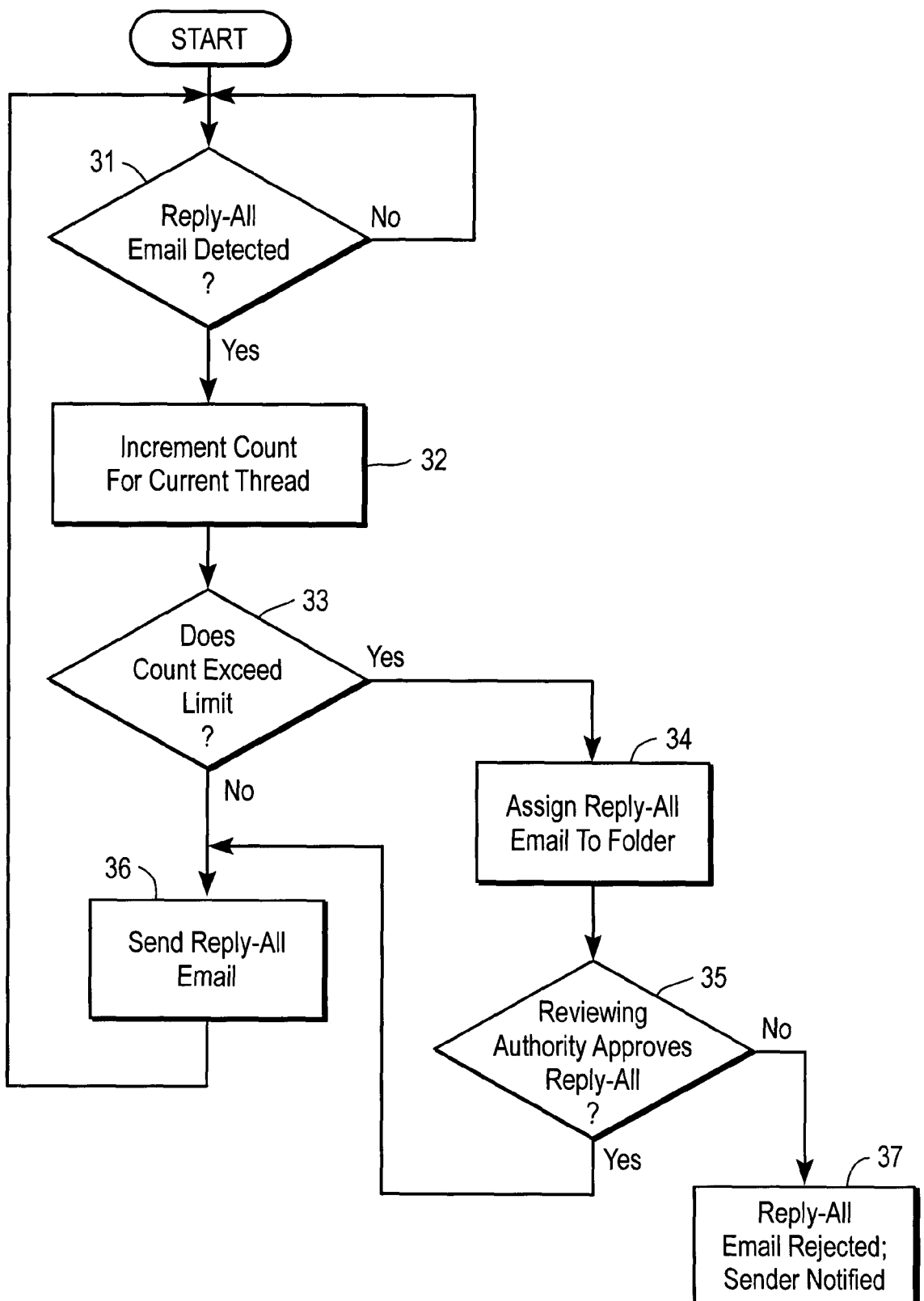
FIG. 3 illustrates another example method of operation for the system of FIG. 1.

FIG. 3 illustrates another example method of operation for the system of FIG. 1. The process shown in FIG. 3 is similar to that of FIG. 2 described above with respect to steps 31-33 and 36, but differs as to the operations performed in the event that the reply-all count is exceeded for the current email thread. In the example shown, if the count exceeds the limit, then the reply-all email composed by a recipient is filtered and stored in a special folder rather than being discarded (block 34). This folder may be accessed by the sender of the original email, a supervisor, administrator, or any other appropriate reviewing authority. For example, a reply-all containing "Org.CEO" may be stored in a folder accessible for review by a staff member of the CEO group before being released to the members of that group. After reading the text of the reply-all email (block 35), the reviewing authority may either approve sending of the reply-all (Block 36) or reject the sending of the reply-all email, which, in this latter case results in the composer/sender receiving a notice that their reply-all was rejected and unsent (block 37).

In one embodiment, when the reply-all email is sent to the folder pending approval, a notice is sent back to the sender of the reply-all notifying them that their reply-all email is awaiting approval for distribution. This notice keeps the sender from attempting to resend the same email under the erroneous belief that his previous email was inadvertently lost or dropped in the system. Also, in one embodiment the client program may notify the reviewing authority (e.g., by displaying an approval dialog) that there is new reply-all email message awaiting approval. The authority could then approve or disapprove the message, e.g., simply by clicking a "yes" or a "no" button on the approval dialog window.

It is appreciated that the reviewing authority may also comprise an automated program, such as a natural language parsing program that may approve sending the reply-all email upon detection of certain predetermined content. For example, the program may scan the reply-all email for a calendar date or time, such as is common in email threads that involve the setting of a meeting or conference, and allow sending of the reply-all email if the reply-all contains date and/or time information.

In a variation of the above embodiment, emails stemming from reply-all actions are stored in a distinct folder, like a "junk email" folder. The system automatically detects that the email has been issued by a reply-all command and assigns the reply-all email to the folder without user intervention. In the event that a reply-all email includes an attachment file, the email system may be configured such that an attachment is sent only once to any given mailbox in order to save storage and network bandwidth, even if subsequent replies or forwards also contain the attachment.

Figure 4:
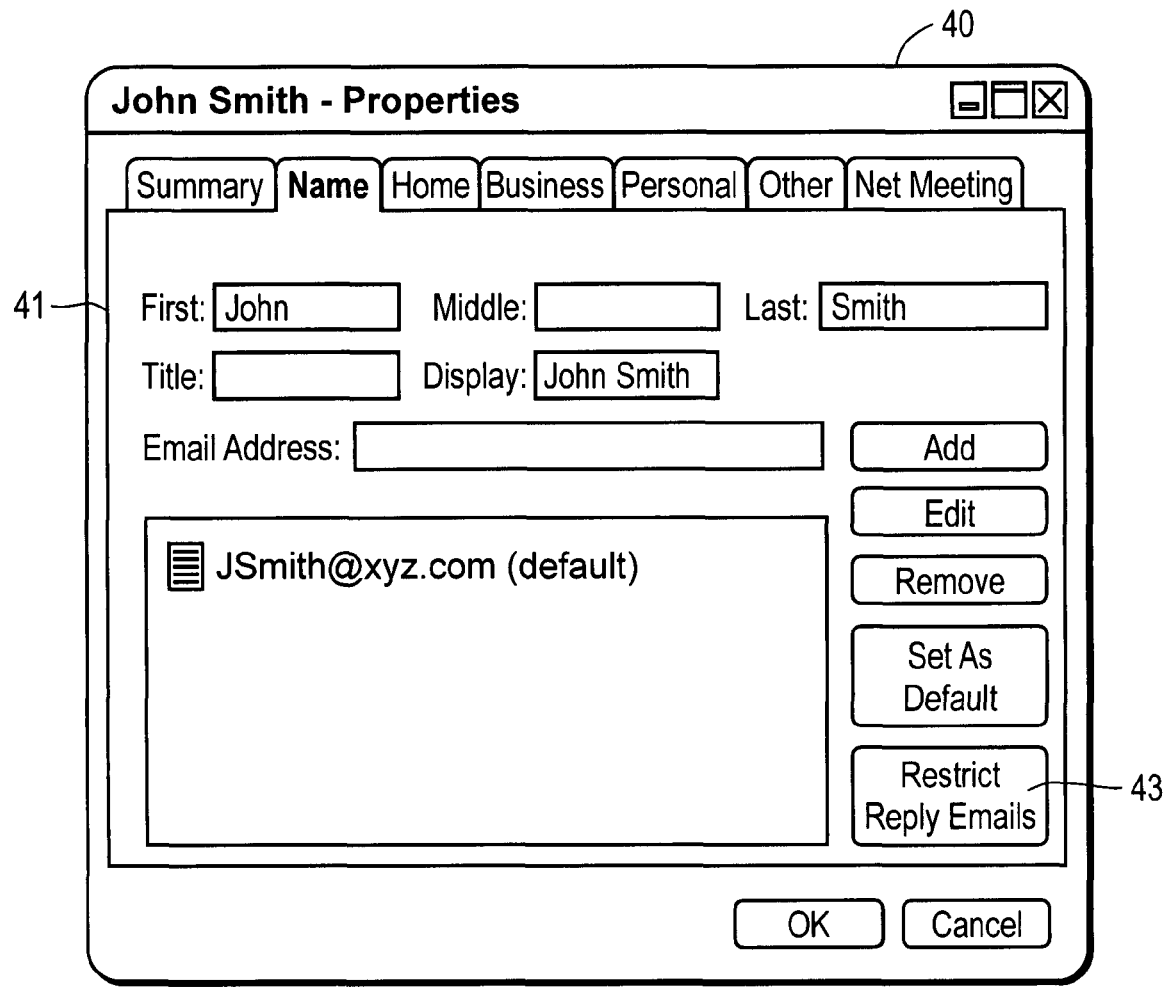
FIG. 4 illustrates an example graphical user interface (GUI) associated with an email client or application.

FIG. 4 illustrates an example graphical user interface (GUI) associated with an email client or application. A user may invoke the GUI in order to specify the properties, including any reply-all policies that he wants to apply to an individual recipient, which in this example is a person named John Smith. FIG. 4 shows a GUI window 40 of an email client or messaging application comprising a Name tab 41 that includes basic identification and email address information. Also included in tab 41 is a "Restrict Reply Emails" command button (icon) 43 that may be clicked-on or otherwise selected by a user to cause the user interface to automatically invoke a wizard for creating a set of rules and policies applicable to reply and/or reply-all emails for sending by John Smith. In other words, clicking icon button 43 triggers the execution of an interactive computer program which functions as an interface to lead the user through the task, using step-by-step dialogs, of creating and storing a set of reply and reply-all rules applicable to John Smith.

It is appreciated that the rule wizard may be integrated into an existing application or email client program, or comprise a separate application or executable code accessible to the user running the GUI shown in FIG. 4. As discussed previously, the reply and reply-all rules may be implemented on a recipient-by-recipient basis, group or business unit basis, or globally to all recipients of a given email (thread). By way of specific example, the rule wizard may include dialogs for restricting the total number of reply-all emails of all recipients, the total number of reply-all emails allowed per recipient, or the total number of reply-all emails permitted for a specific individual (e.g., listed in an email client address book).

Figure 5:
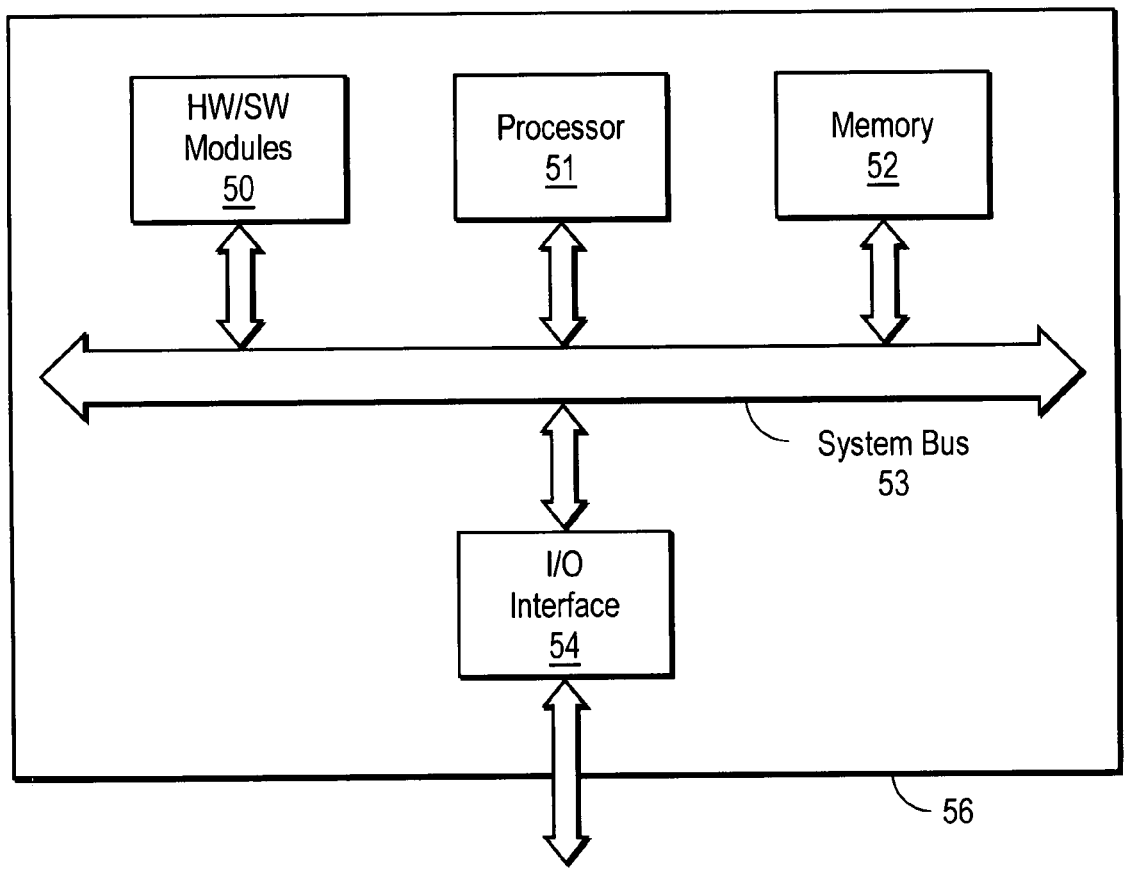
FIG. 5 illustrates an example network device or node.

FIG. 5 is a generalized block diagram showing an example network device or node 56, such as may comprise any of the devices (e.g., a PC or server) or nodes shown or described above. Node 56 includes a processor subsystem 51 coupled with a memory unit 52, one or more hardware/software modules 50, and an input/output (I/O) interface 54 via a system bus 53. Modules 50 may include software, firmware, or logic embedded in hardware for implementing any of the functions described herein, e.g., those functions associated with automatic restriction of email replies.

It is appreciated that any messaging and/or email system utilized by or in conjunction with node 56 may comprise separate hardware devices coupled to the system bus 53, or, alternatively, implemented as software programs or modules 50 that run on one or more processors of subsystem 51. In other words, the composing, sending, storing, and receiving of electronic messages, as well as other associated functions may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Additionally, although the present invention has been described in conjunction with specific embodiments, numerous modifications and alterations are well within the scope of the present invention. For instance, although functions and methods of various embodiments have been described as being embodied on an email application running on a network node (server) separate from various other specific applications/systems, it is appreciated that these same methods and functions may be embodied on an endpoint device of a user, another server or client, a messaging application, or a third party service application program accessible via a web-based browser. Accordingly, the specification and drawings are to be regarded in an illustrative rather than a restrictive sense.

We claim:

1. A method comprising:

detecting, by an automated program, an attempt by a recipient of an email addressed to a plurality of addressees that includes the recipient to send a reply-all email, the reply-all email being addressed to all of the addressees excluding the recipient; and rejecting, by the automated program, the reply-all email based on a pre-set policy rule that limits a number of reply-all email in a thread, the pre-set policy rule comprising a reply-all limit count implemented in a directory service.

2. The method of claim 1 wherein the email comprises a previous reply-all email of the thread.

3. The method of claim 1 wherein the automated program comprises executable code running on an email server.

4. The method of claim 1 further comprising notifying, by the automated program, the recipient that the reply-all email has been rejected.

5. The method of claim 1 further comprising incrementing the reply-all limit count after detecting the attempt to send the reply-all email.

6. A processor-implemented method, comprising:
- detecting, by an automated program, an attempt by a recipient of an email addressed to a plurality of addressees that includes the recipient to send a reply-all email of an email thread, the reply-all email being addressed to all of the addressees, excluding the recipient;
- incrementing a reply-all count after detecting the attempt to send the reply-all email, the reply-all count being specific to the recipient;
- comparing the reply-all count to a pre-set reply-all limit; and
- rejecting, by the automated program, the reply-all email in the event that the reply-all count exceeds the pre-set reply-all limit; otherwise, sending the reply-all email.

7. The processor-implemented method of claim 6 wherein the email comprises a previous reply-all email of the email thread.

8. The processor-implemented method of claim 6 further comprising setting, by either a sender of an original email of the email thread or an administrator, the pre-set reply-all limit.

9. The processor-implemented method of claim 8 further comprising sending of the original email, and wherein the setting of the pre-set reply-all limit occurs prior to the sending of the original email.

10. The processor-implemented method of claim 6 further comprising notifying, by the automated program, the recipient that the reply-all email has been rejected in the event that the reply-all count exceeds the pre-set reply-all limit.

11. The processor-implemented method of claim 8 wherein the setting of the pre-set reply-all limit pre-set policy rule comprises accessing a directory.

\* \* \* \* \*